Patented Feb. 3, 1931

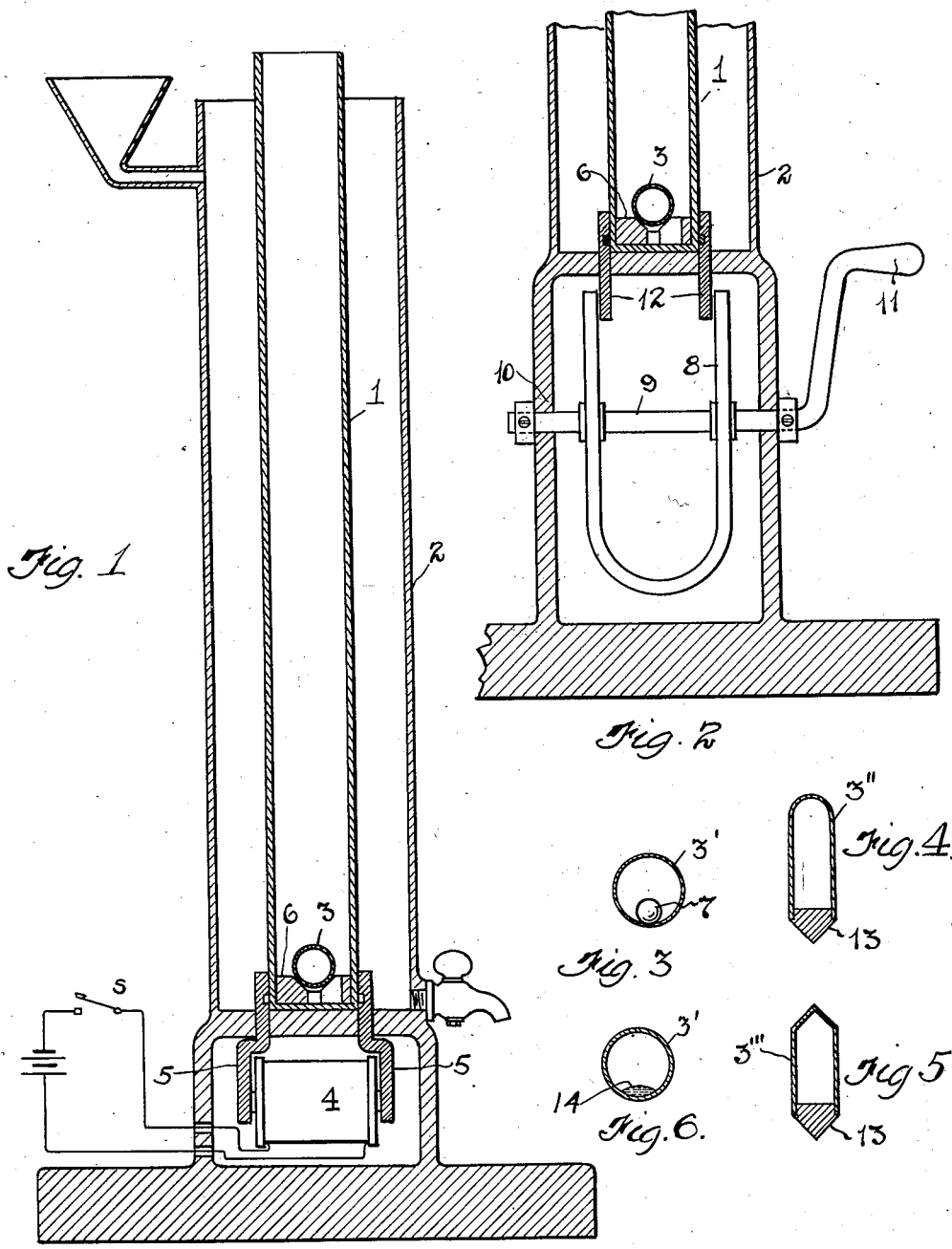

1,790,948

UNITED STATES PATENT OFFICE

SAMUEL T. RODGERS, OF SHAKER HEIGHTS, OHIO

METHOD OF AND APPARATUS FOR DETERMINING VISCOSITY

Application filed April 12, 1926. Serial No. 101,352.

This invention relates more particularly to devices for a practical measuring of what is commonly referred to as the viscosity of liquids, and it is among the objects of the invention to provide an instrument which eliminates uncertain mechanical factors, and which can be used with opaque liquids as well as with clear liquids. Other objects and advantages will appear as the description proceeds.

In the present practice, there are a number of different types of viscosimeters in use. The most common is the efflux type, this consisting of a receptacle for the liquid to be tested and having an outlet orifice of selected dimension. The liquid is placed in the receptacle with the orifice closed and is brought to standard temperature by suitable means. The orifice is then opened and the time in seconds required for the liquid to run out is taken as the measure of viscosity. This type of instrument is open to the objection that the rate of flow through the orifice varies with the head of liquid, also variable quantities of liquid will be retained by the walls of the receptacle, and the reading moreover is in purely arbitrary terms. Another type of viscosimeter employs a falling weight which causes a cylinder to rotate in the liquid to be tested, and the retarding effect of the liquid as compared with that of distilled water is taken as the measure of viscosity. In another form, the measuring is in terms of the deflection of a torsion member, caused by the rotation at a constant speed of the receptacle holding the liquid. In such mechanical type instruments varying friction in the weight-operated mechanism or variation in the strength of the torsion spring introduce errors. In another type of instrument, a glass tube holding the liquid is provided with corks at both ends and a steel ball of a specified size. On inverting the tube the ball falls through the liquid, and the time required for it to traverse a given distance is taken as the viscosity. In another form, small glass tubes of a standard size are filled not quite full of the liquid to be tested and when closed with corks and quickly inverted, the bubble of air travels from the bottom to the top, and the speed of movement of the bubble is taken as the measure of the viscosity. In both of these latter instruments, opaque liquids can not be used. An instrument which can be used with opaque liquids and which is free from mechanically introduced sources of variation and error is accordingly highly desirable.

To the accomplishment of the foregoing and related ends, the invention, then, consists of the means hereinafter fully described, and particularly pointed out in the claims, the annexed drawing and the following description setting forth in detail certain features embodying the invention, such disclosed means constituting, however, but one of various forms in which the principle of the invention may be used.

In said annexed drawing:—

Fig. 1 is a vertical sectional view of an instrument embodying the present invention; Fig. 2 is a similar view of a modification; and Figs. 3, 4, 5 and 6 are sectional views of modified forms of an element in the construction.

In its general aspects, the device comprises a receptacle for holding a column of the liquid to be tested, and a buoyant body controllably releasable to ascend through the liquid, while the time required is observed. The receptacle 1 is preferably of cylindrical form, and of selected dimension, and it may if desired be surrounded by a jacket 2 for a temperature-regulating fluid, for instance water. The buoyant body 3 may in some instances be held and released by mechanical means, but in order to avoid drag and side thrust, I prefer a magnetic control. This may comprise an electromagnet 4 having pole pieces 5 extended opposite the resting position of the buoyant body, and a battery or other suitable source of current and a switch for controlling the current flow to the magnet, further description and illustration of the circuit detail being unnecessary. A seat is desirably provided for the buoyant body, either as a removable inset or by the bottom of the receptacle itself. Preferably the seat is in the form of a spider or grid 6 with spaced radial arms projecting toward the center, this construction allowing uniform access of the liquid to the buoyant body. The buoyant body in order to respond to the magnetic field may be made up of magnetic metal to selected size and weight, or it may be made up of non-magnetic material and have a content of magnetic material as at 7, Fig. 3, or other formed desired. Where the shell is made up of magnetic metal I may inclose an additional weighting or weight-adjusting agent in the form of a liquid 14, Fig. 6, this allowing ready balancing by change of position. An advantageous agent for this purpose is mercury.

Instead of an electromagnet, a permanent magnet 8, Fig. 2, is desirable in some instances, and in order to interrupt the magnetic field opposite the buoyant body, the magnet may be rockably or rotatably mounted, as for instance, by a spindle 9 having a handle 11 for rocking or rotating it away from pole-pieces 12 of soft iron extended from alignment with the magnet poles to opposite the seat of the buoyant body.

While in most instances, the spherical form of buoyant body is most desirable, 1 also contemplate bodies of elongated form, as in Figs. 4 and 5, having either a rounded or a conical upper end and being formed either of magnetic metal with a weighted portion below or of non-magnetic material for the upper portion 3″ or 3‴, respectively and a magnetic portion 13 at the lower end.

In using the device, the buoyant body is placed at the bottom of the receptacle and the current is turned on, in the case of the electromagnet, or in the case of the permanent magnet, the handle 11 is turned to a position to bring the magnet poles opposite the extension pole pieces 12. The liquid to be tested is now poured into the receptacle to the predetermined extent and is brought to standard temperature, by any suitable means, for instance by water of controlled temperature in the jacket, and on interrupting the magnetic field by breaking the flow of current to the electromagnet or by rocking the permanent magnet poles away from the extension pole pieces 12, as the case may be, the buoyant body is released and travels up the receptacle. With a stop watch or other convenient means of time observation, the times of release and of arrival at the top are noted, and this forms the terms for the reading desired.

By the use of buoyant bodies of different dimensions and weight, or density, liquids of a wide scope may be tested; in each case the size of the receptacle and the weight and form of construction of the buoyant body being laid out to standardized specifications.

Other modes of applying the principle of my invention may be employed, change being made as regards the features of construction, provided the means set forth in the following claims or the equivalent of such stated means be employed.

I therefore particularly point out and distinctly claim as my invention:—

1. In a testing method of the character described, the steps which consist of controllably holding a buoyant body in the lower part of a column of liquid to be tested, releasing such body that it may rise through the liquid, and measuring the time incurred in rising.

2. In a testing method of the character described, the steps which consist of magnetically holding a buoyant body in the lower part of a column of liquid to be tested, interrupting the magnetic field to release such body, and measuring the time incurred in its rising through the liquid.

3. In a device of the character described, the combination of a receptacle for holding a liquid to be tested, a buoyant body, and means for controllably releasably holding said body in the lower part of said receptacle without interfering with the condition of the liquid.

4. In a device of the character described, the combination of a receptacle for holding a liquid to be tested, a magnetically controlled buoyant body, magnetic means for holding said body in the lower part of said receptacle, and means for interrupting the magnetic field.

5. In a device of the character described, the combination of a receptacle for holding a liquid to be tested, a buoyant body having a part at least of magnetic metal, means for providing a magnetic field therefor in the lower part of said receptacle, and means for interrupting the magnetic field.

6. In a device of the character described, the combination of a receptacle for holding a liquid to be tested, a buoyant body responsive to a magnetic field, an electro-magnet presenting a pole piece for controlling said buoyant body at the lower part of said receptacle, means for supplying current to said magnet, and means for interrupting the current flow.

Signed by me this 9th day of April, 1926.

SAMUEL T. RODGERS.